United States Patent
Gass et al.

(10) Patent No.: US 7,000,514 B2
(45) Date of Patent: Feb. 21, 2006

(54) SAFETY SYSTEMS FOR BAND SAWS

(75) Inventors: Stephen F. Gass, Wilsonville, OR (US); Randall J. Huebner, Beaverton, OR (US)

(73) Assignee: SD3, LLC, Wilsonville, OR (US)

( * ) Notice: Subject to any disclaimer, the term of this patent is extended or adjusted under 35 U.S.C. 154(b) by 13 days.

(21) Appl. No.: 10/202,928

(22) Filed: Jul. 25, 2002

(65) Prior Publication Data

US 2003/0019341 A1   Jan. 30, 2003

Related U.S. Application Data

(60) Provisional application No. 60/308,492, filed on Jul. 27, 2001.

(51) Int. Cl.
*B26D 5/00* (2006.01)
(52) U.S. Cl. .............................. 83/58; 83/788; 83/793; 83/DIG. 1; 192/129 R
(58) Field of Classification Search ............. 83/58, 83/68.1, 788, 793, DIG. 1; 30/380; 192/129 R, 192/129 A, 129 B; 76/25.1; 72/1, 3; 188/65.1
See application file for complete search history.

(56) References Cited

U.S. PATENT DOCUMENTS

| | | |
|---|---|---|
| 941,726 A | 11/1909 | Pfalzgraf |
| 1,205,246 A | 11/1916 | Mowry |
| 1,551,900 A | 9/1925 | Morrow |
| 1,807,120 A | 5/1931 | Lewis |
| 1,811,066 A | 6/1931 | Tannewitz |
| 1,896,924 A | 2/1933 | Ulrich |
| 1,902,270 A | 3/1933 | Tate |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 2,007,887 A | 7/1935 | Tautz |
| 2,020,222 A | 11/1935 | Tautz |
| 2,038,810 A | 4/1936 | Tautz |
| 2,106,288 A | 1/1938 | Tautz |
| 2,163,320 A | 6/1939 | Hammond |
| 2,241,556 A | 5/1941 | MacMillin et al. |
| 2,286,589 A * | 6/1942 | Tannewitz ............... 83/62.1 |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,425,331 A | 8/1947 | Kramer |
| 2,434,174 A * | 1/1948 | Morgan ............... 188/65.1 |
| 2,466,325 A | 4/1949 | Ocenasek |
| 2,496,613 A | 2/1950 | Woodward |
| 2,509,813 A | 5/1950 | Dineen |

(Continued)

FOREIGN PATENT DOCUMENTS

CH        297525        6/1954

(Continued)

OTHER PUBLICATIONS

Gordon Engineering Corp., Product Catalog, Oct. 1997, pgs. cover., 1, 3 and back, Brookfield, Connecticut, US.

(Continued)

*Primary Examiner*—Boyer D. Ashley
*Assistant Examiner*—Jason Prone (57) ABSTRACT

Band saws with high-speed safety systems are disclosed. The band saws include a detection system adapted to detect a dangerous condition between a blade and a person. A reaction system performs a specified action such as stopping the blade upon detection of the dangerous condition.

15 Claims, 9 Drawing Sheets

U.S. PATENT DOCUMENTS

| | | |
|---|---|---|
| 2,517,649 A | 8/1950 | Frechtmann |
| 2,562,396 A | 7/1951 | Schutz |
| 2,572,326 A | 10/1951 | Evans |
| 2,593,596 A | 4/1952 | Olson |
| 2,601,878 A | 7/1952 | Anderson |
| 2,623,555 A | 12/1952 | Eschenburg |
| 2,661,780 A * | 12/1953 | Morgan ..................... 188/161 |
| 2,675,707 A | 4/1954 | Brown |
| 2,690,084 A | 9/1954 | Van Dam |
| 2,722,246 A | 11/1955 | Arnoldy |
| 2,731,049 A | 1/1956 | Akin |
| 2,736,348 A | 2/1956 | Nelson |
| 2,785,710 A | 3/1957 | Mowery, Jr. |
| 2,786,496 A | 3/1957 | Eschenburg |
| 2,954,118 A | 9/1960 | Anderson |
| 2,978,084 A | 4/1961 | Vilkaitis |
| 2,984,268 A | 5/1961 | Vuichard |
| 2,991,593 A | 7/1961 | Cohen |
| 3,011,610 A | 12/1961 | Stiebel et al. |
| 3,047,116 A | 7/1962 | Stiebel et al. |
| 3,129,731 A | 4/1964 | Tyrell |
| 3,163,732 A | 12/1964 | Abbott |
| 3,186,256 A | 6/1965 | Reznick |
| 3,207,273 A | 9/1965 | Jurin |
| 3,224,474 A | 12/1965 | Bloom |
| 3,313,185 A | 4/1967 | Drake et al. |
| 3,323,814 A | 6/1967 | Phillips |
| 3,337,008 A | 8/1967 | Trachte |
| 3,386,322 A | 6/1968 | Stone et al. |
| 3,454,286 A | 7/1969 | Anderson et al. |
| 3,540,338 A | 11/1970 | McEwan et al. |
| 3,554,067 A | 1/1971 | Scutella |
| 3,566,996 A | 3/1971 | Crossman |
| 3,581,784 A | 6/1971 | Warrick |
| 3,613,748 A | 10/1971 | De Pue |
| 3,675,444 A | 7/1972 | Whipple |
| 3,680,609 A | 8/1972 | Menge |
| 3,688,815 A | 9/1972 | Ridenour |
| 3,695,116 A | 10/1972 | Baur |
| 3,745,546 A | 7/1973 | Struger et al. |
| 3,749,933 A | 7/1973 | Davidson |
| 3,772,590 A | 11/1973 | Mikulecky et al. |
| 3,785,230 A | 1/1974 | Lokey |
| 3,829,850 A | 8/1974 | Guetersich |
| 3,858,095 A | 12/1974 | Friemann et al. |
| 3,861,016 A | 1/1975 | Johnson et al. |
| 3,863,208 A | 1/1975 | Balban |
| 3,882,744 A | 5/1975 | McCarroll |
| 3,886,413 A | 5/1975 | Dow et al. |
| 3,922,785 A | 12/1975 | Fushiya |
| 3,924,688 A | 12/1975 | Cooper et al. |
| 3,931,727 A | 1/1976 | Luenser |
| 3,935,777 A | 2/1976 | Bassett |
| 3,945,286 A | 3/1976 | Smith |
| 3,946,631 A | 3/1976 | Malm |
| 3,947,734 A | 3/1976 | Fyler |
| 3,953,770 A | 4/1976 | Hayashi |
| 3,967,161 A | 6/1976 | Lichtblau |
| 3,974,565 A | 8/1976 | Ellis |
| 3,975,600 A | 8/1976 | Marston |
| 4,007,679 A | 2/1977 | Edwards |
| 4,016,490 A | 4/1977 | Weckenmann et al. |
| 4,026,177 A | 5/1977 | Lokey |
| 4,029,159 A | 6/1977 | Nymann |
| 4,047,156 A | 9/1977 | Atkins |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,106,378 A | 8/1978 | Kaiser |
| 4,117,752 A | 10/1978 | Yoneda |
| 4,145,940 A | 3/1979 | Woloveke et al. |
| 4,152,833 A | 5/1979 | Phillips |
| 4,161,649 A | 7/1979 | Klos et al. |
| 4,175,452 A * | 11/1979 | Idel ........................... 76/25.1 |
| 4,190,000 A | 2/1980 | Shaull et al. |
| 4,195,722 A | 4/1980 | Anderson et al. |
| 4,249,117 A | 2/1981 | Leukhardt et al. |
| 4,249,442 A | 2/1981 | Fittery |
| 4,262,278 A | 4/1981 | Howard et al. |
| 4,267,914 A | 5/1981 | Saar |
| 4,270,427 A | 6/1981 | Colberg et al. |
| 4,276,799 A | 7/1981 | Muehling |
| 4,305,442 A | 12/1981 | Currie |
| 4,321,841 A | 3/1982 | Felix |
| 4,372,202 A | 2/1983 | Cameron |
| 4,391,358 A | 7/1983 | Haeger |
| 4,466,233 A | 8/1984 | Thesman |
| 4,470,046 A | 9/1984 | Betsill |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,560,033 A | 12/1985 | DeWoody et al. |
| 4,566,512 A | 1/1986 | Wilson |
| 4,573,556 A | 3/1986 | Andreasson |
| 4,589,047 A | 5/1986 | Gaus et al. |
| 4,599,597 A | 7/1986 | Rotbart |
| 4,599,927 A | 7/1986 | Eccardt et al. |
| 4,606,251 A * | 8/1986 | Boileau ....................... 83/788 |
| 4,621,300 A | 11/1986 | Summerer |
| 4,637,188 A | 1/1987 | Crothers |
| 4,637,289 A | 1/1987 | Ramsden |
| 4,672,500 A | 6/1987 | Tholome et al. |
| 4,722,021 A | 1/1988 | Hornung et al. |
| 4,751,603 A | 6/1988 | Kwan |
| 4,757,881 A | 7/1988 | Jonsson et al. |
| 4,792,965 A | 12/1988 | Morgan |
| 4,805,504 A | 2/1989 | Fushiya et al. |
| 4,840,135 A | 6/1989 | Yamauchi |
| 4,864,455 A | 9/1989 | Shimomura et al. |
| 4,896,607 A | 1/1990 | Hall et al. |
| 4,906,962 A | 3/1990 | Duimstra |
| 4,934,233 A | 6/1990 | Brundage et al. |
| 4,936,876 A | 6/1990 | Reyes |
| 4,937,554 A | 6/1990 | Herman |
| 4,965,909 A | 10/1990 | McCullough et al. |
| 4,975,798 A | 12/1990 | Edwards et al. |
| 5,020,406 A | 6/1991 | Sasaki et al. |
| 5,025,175 A | 6/1991 | Dubois, III |
| 5,046,426 A | 9/1991 | Julien et al. |
| 5,052,255 A | 10/1991 | Gaines |
| 5,081,406 A | 1/1992 | Hughes et al. |
| 5,082,316 A | 1/1992 | Wardlaw |
| 5,086,890 A | 2/1992 | Turczyn et al. |
| 5,094,000 A | 3/1992 | Becht et al. |
| 5,119,555 A | 6/1992 | Johnson |
| 5,122,091 A | 6/1992 | Townsend |
| 5,184,534 A | 2/1993 | Lee |
| 5,198,702 A | 3/1993 | McCullough et al. |
| 5,199,343 A | 4/1993 | OBanion |
| 5,201,684 A | 4/1993 | DeBois, III |
| 5,207,253 A | 5/1993 | Hoshino et al. |
| 5,212,621 A | 5/1993 | Panter |
| 5,218,189 A | 6/1993 | Hutchison |
| 5,239,978 A | 8/1993 | Plangetis |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |

| | | |
|---|---|---|
| 5,276,431 A | 1/1994 | Piccoli et al. |
| 5,285,708 A | 2/1994 | Bosten et al. |
| 5,320,382 A | 6/1994 | Goldstein et al. |
| 5,321,230 A | 6/1994 | Shanklin et al. |
| 5,331,875 A | 7/1994 | Mayfield |
| 5,353,670 A | 10/1994 | Metzger, Jr. |
| 5,377,554 A | 1/1995 | Reulein et al. |
| 5,377,571 A | 1/1995 | Josephs |
| 5,392,678 A | 2/1995 | Sasaki et al. |
| 5,401,928 A | 3/1995 | Kelley |
| 5,451,750 A | 9/1995 | An |
| 5,453,903 A | 9/1995 | Chow |
| 5,471,888 A | 12/1995 | McCormick |
| 5,480,009 A | 1/1996 | Wieland et al. |
| 5,503,059 A | 4/1996 | Pacholok |
| 5,510,685 A | 4/1996 | Grasselli |
| 5,534,836 A | 7/1996 | Schenkel et al. |
| 5,592,353 A | 1/1997 | Shinohara et al. |
| 5,606,889 A | 3/1997 | Bielinski et al. |
| 5,623,860 A | 4/1997 | Schoene et al. |
| 5,648,644 A | 7/1997 | Nagel |
| 5,659,454 A | 8/1997 | Vermesse |
| 5,667,152 A | 9/1997 | Mooring |
| 5,671,633 A | 9/1997 | Wagner |
| 5,695,306 A | 12/1997 | Nygren, Jr. |
| 5,700,165 A | 12/1997 | Harris et al. |
| 5,724,875 A | 3/1998 | Meredith et al. |
| 5,730,165 A | 3/1998 | Philipp |
| 5,741,048 A | 4/1998 | Eccleston |
| 5,755,148 A | 5/1998 | Stumpf et al. |
| 5,771,742 A | 6/1998 | Bokaie et al. |
| 5,782,001 A | 7/1998 | Gray |
| 5,787,779 A | 8/1998 | Garuglieri |
| 5,791,057 A | 8/1998 | Nakamura et al. |
| 5,791,223 A | 8/1998 | Lanzer |
| 5,791,224 A | 8/1998 | Suzuki et al. |
| 5,791,441 A | 8/1998 | Matos et al. |
| 5,819,619 A | 10/1998 | Miller et al. |
| 5,861,809 A | 1/1999 | Eckstein et al. |
| 5,921,367 A | 7/1999 | Kashioka et al. |
| 5,930,096 A | 7/1999 | Kim |
| 5,937,720 A | 8/1999 | Itzov |
| 5,942,975 A | 8/1999 | Sorensen |
| 5,943,932 A | 8/1999 | Sberveglieri |
| 5,950,514 A | 9/1999 | Benedict et al. |
| 5,963,173 A | 10/1999 | Lian et al. |
| 6,018,284 A | 1/2000 | Rival et al. |
| 6,037,729 A | 3/2000 | Woods et al. |
| 6,052,884 A | 4/2000 | Steckler et al. |
| 6,095,092 A | 8/2000 | Chou |
| 6,119,984 A | 9/2000 | Devine |
| 6,133,818 A | 10/2000 | Hsieh et al. |
| 6,141,192 A | 10/2000 | Garzon |
| 6,148,504 A | 11/2000 | Schmidt et al. |
| 6,244,149 B1 | 6/2001 | Ceroll et al. |
| 6,257,061 B1 | 7/2001 | Nonoyama et al. |
| 6,352,137 B1 | 3/2002 | Stegall et al. |
| 6,366,099 B1 | 4/2002 | Reddi |
| 6,404,098 B1 | 6/2002 | Kayama et al. |
| 6,418,829 B1 | 7/2002 | Pilchowski |
| 6,420,814 B1 | 7/2002 | Bobbio |
| 6,427,570 B1 | 8/2002 | Miller et al. |
| 6,430,007 B1 | 8/2002 | Jabbari |
| 6,450,077 B1 | 9/2002 | Ceroll et al. |
| 6,453,786 B1 | 9/2002 | Ceroll et al. |
| 6,460,442 B1 | 10/2002 | Talesky et al. |
| 6,479,958 B1 | 11/2002 | Thompson et al. |
| D466,913 S | 12/2002 | Ceroll et al. |
| D469,354 S | 1/2003 | Curtsinger |
| 6,536,536 B1 | 3/2003 | Gass et al. |
| 6,543,324 B1 | 4/2003 | Dils |
| 6,546,835 B1 | 4/2003 | Wang |
| 6,575,067 B1 | 6/2003 | Parks et al. |
| 6,578,856 B1 | 6/2003 | Kahle |
| 6,595,096 B1 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,619,348 B1 | 9/2003 | Wang |
| 6,640,683 B1 | 11/2003 | Lee |
| 6,644,157 B1 | 11/2003 | Huang |
| 6,647,847 B1 | 11/2003 | Hewitt et al. |
| 6,659,233 B1 | 12/2003 | DeVlieg |
| 6,742,430 B1 | 6/2004 | Chen |
| 6,874,397 B1 | 4/2005 | Chang |
| 6,874,399 B1 | 4/2005 | Lee |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 * | 2/2002 | Gass et al. .................. 83/477.2 |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0109036 A1 | 8/2002 | Denen et al. |
| 2002/0170399 A1 | 11/2002 | Gass et al. |
| 2002/0170400 A1 * | 11/2002 | Gass .......................... 83/62.1 |
| 2002/0190581 A1 | 12/2002 | Gass et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0074873 A1 | 4/2003 | Freiberg et al. |
| 2003/0089212 A1 | 5/2003 | Parks et al. |
| 2003/0109798 A1 | 6/2003 | Kermani |
| 2004/0011177 A1 | 1/2004 | Huang |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |

FOREIGN PATENT DOCUMENTS

| | | |
|---|---|---|
| DE | 76186 | 8/1921 |
| DE | 2800403 | 7/1979 |
| DE | 3427733 | 1/1986 |

| | | |
|---|---|---|
| DE | 4235161 A1 | 5/1993 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |

OTHER PUBLICATIONS

*You Should Have Invented It*, French television show video.

U.S. Appl. No. 60/157,340, filed Oct. 1, 1999, entitled "Fast-Acting Safety Stop."

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of US patent applications referenced in the form are from U.S. Appl. No. 60/157,340 filed Oct. 1, 1999 and U.S. Appl. No. 60/182,866 filed Feb. 16, 2000).

* cited by examiner

Fig. 12

SAFETY SYSTEMS FOR BAND SAWS

CROSS-REFERENCE TO RELATED APPLICATIONS

This application claims the benefit of and priority from the following U.S. Provisional Patent Application, the disclosure of which is herein incorporated by reference: Ser. No. 60/308,492, filed Jul. 27, 2001.

FIELD

The present invention relates to band saws, and more particularly to band saws with high-speed safety systems.

BACKGROUND

Band saws are a type of machinery used to cut workpieces of wood, plastic and other materials. Band saws include two, spaced-apart wheels, and a blade tightly looped around the wheels. The blade is made from a band of metal with teeth on one edge of the band. The blade moves around the wheels when the wheels spin. Band saws also include a table or work surface adjacent the blade and upon which workpieces are placed. A person uses the band saw by placing a workpiece on the table and then sliding the workpiece into the moving blade. Band saws present a risk of injury to users because the blade is exposed when in use. Furthermore, users often must place their hands very close to the blade to position and move workpieces, which increases the chance that an injury will occur.

This document discloses improved safety systems for band saws. The safety systems are adapted to detect the occurrence of one or more dangerous, or triggering, conditions during use of the band saw, such as when a user's body contacts the moving blade. When such a condition occurs, the safety system is actuated to limit or even prevent injury to the user.

DETAILED DESCRIPTION

Figure 1:
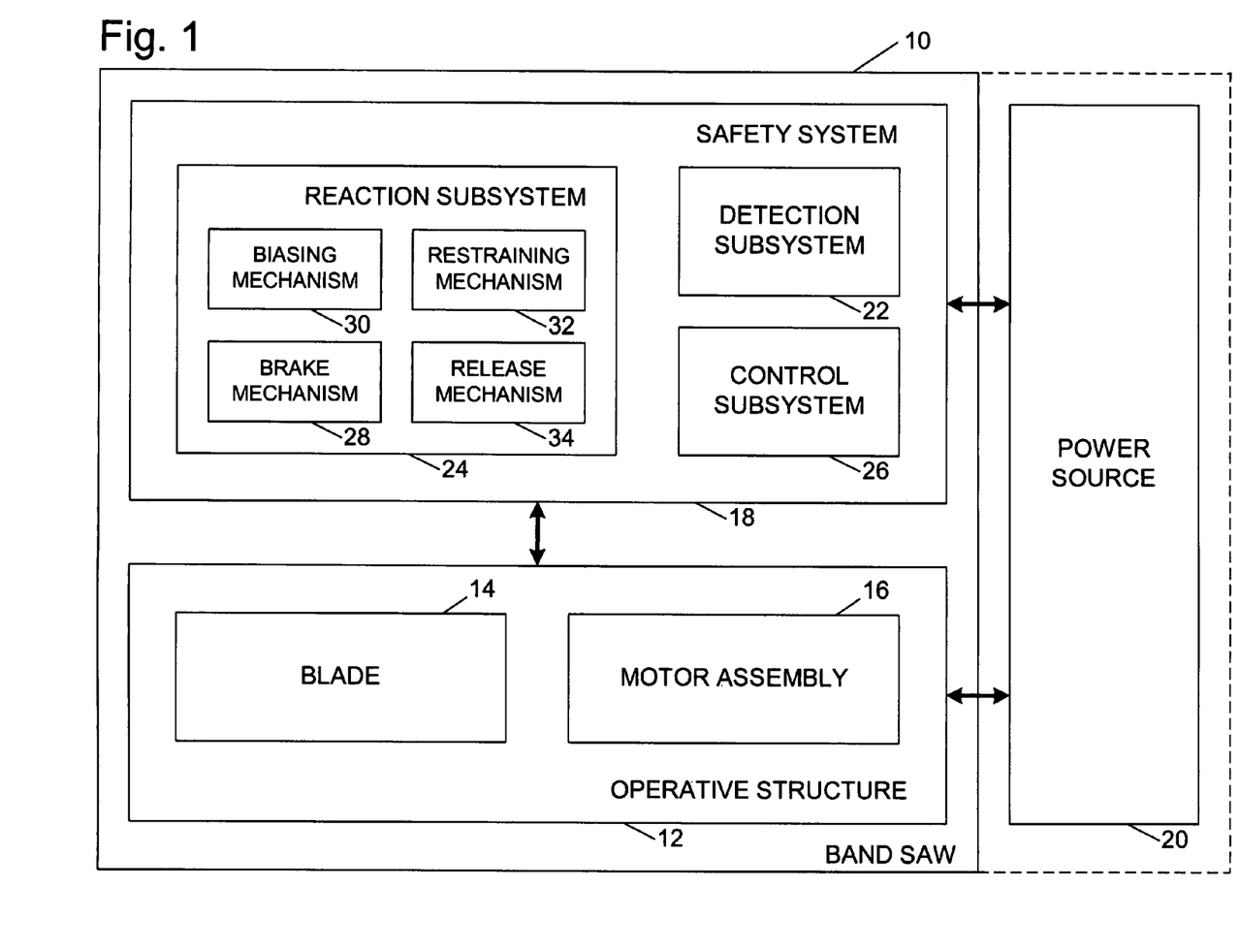
FIG. 1 is a schematic block diagram of a band saw with a fast-acting safety system.

A band saw according to the present invention is shown schematically in FIG. 1 and indicated generally at 10. Band saw 10 may be any of a variety of different types and configurations of band saws adapted for cutting workpieces, such as wood and plastic. Band saw 10 includes an operative structure 12 having a blade 14 and a motor assembly 16 adapted to drive the blade. Band saw 10 also includes a safety system 18 configured to minimize the potential of a serious injury to a person using the band saw. Safety system 18 is adapted to detect the occurrence of one or more dangerous, or triggering, conditions during use of band saw 10. If such a dangerous condition is detected, safety system 18 is adapted to engage operative structure 12 to limit any injury to the user caused by the dangerous condition.

Band saw 10 includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of band saw 10.

It will be appreciated that operative structure 12 may take any one of many different forms, depending on the type of band saw 10. As will be described in more detail below, operative structure 12 typically includes two, spaced-apart wheels and a table adjacent the wheels. A blade 14, made from a band of metal with teeth along one edge of the band, is positioned around the wheels adjacent the table. Motor assembly 16 includes one or more motors adapted to drive blade 14 by spinning at least one of the wheels around which the blade is positioned.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of band saw 10. In addition, control subsystem 26 typically includes one or more instruments operable by a user to control the band saw. The control subsystem is configured to control band saw 10 in response to the inputs it receives.

Detection subsystem 22 is configured to detect one or more dangerous, or triggering, conditions during use of band saw 10. For example, the detection subsystem may be configured to detect that a portion of the user's body is in contact with a portion of blade 14. In some embodiments, detection subsystem 22 may inform control subsystem 26 of the dangerous condition, which then activates reaction subsystem 24. In other embodiments, the detection subsystem may be adapted to activate the reaction subsystem directly. Various exemplary embodiments and implementations of detection subsystem 22 are described in more detail in U.S. Provisional Patent Application Ser. No. 60/225,200, entitled "Contact Detection System for Power Equipment," filed Aug. 14, 2000, by SD3, LLC, the disclosure of which is incorporated herein by reference. Additional exemplary embodiments are described in U.S. Provisional Patent Application Ser. No. 60/225,211, entitled "Apparatus and Method for Detecting Dangerous Conditions in Power Equipment," the disclosure of which is also incorporated herein by reference.

Once activated in response to a dangerous condition, reaction subsystem 24 is configured to quickly engage operative structure 12 to prevent serious injury to the user. It will be appreciated that the particular action to be taken by reaction subsystem 24 will vary depending on the type of band saw 10 and/or the dangerous condition that is detected. For example, reaction subsystem 24 may be configured to do one or more of the following: stop the movement of blade 14 by cutting the blade and/or by gripping the blade, disconnect motor assembly 16 from power source 20, place a barrier between the blade and the user, or retract the blade from its operating position, etc. The reaction subsystem may be configured to take a combination of steps to protect the user from serious injury. Systems that place a barrier between a blade the cutting tool and a person is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Systems to retract cutting tools such as blades from operating positions are described in more detail in U.S. Provisional Patent Application Ser. No. 60/225,089, entitled "Retraction System For Use In Power Equipment," also filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of blade 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of band saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the blade to a stop.

Control subsystem 26 includes one or more instruments that are operable by a user to control the motion of blade 14. Those instruments may include start/stop switches, speed controls, etc. Control subsystem 26 typically includes a logic controller connected to receive the user's inputs via the instruments. The logic controller is also connected to receive a contact detection signal from detection subsystem 22. Further, the logic controller may be configured to receive inputs from other sources, such as blade motion sensors, workpiece sensors, etc. In any event, the logic controller is configured to control operative structure 12 in response to the user's inputs. However, upon receipt of a contact detection signal from detection subsystem 22, the logic controller overrides the control inputs from the user and activates reaction subsystem 24 to stop the motion of the blade. Various exemplary embodiments and implementations of control subsystem 26, including the logic controller, are described in more detail in U.S. Provisional Patent Application Ser. No. 60/225,059, entitled "Logic Control For Fast Acting Safety System," filed Aug. 14, 2000 by SD3, LLC, and in U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

Figure 2:
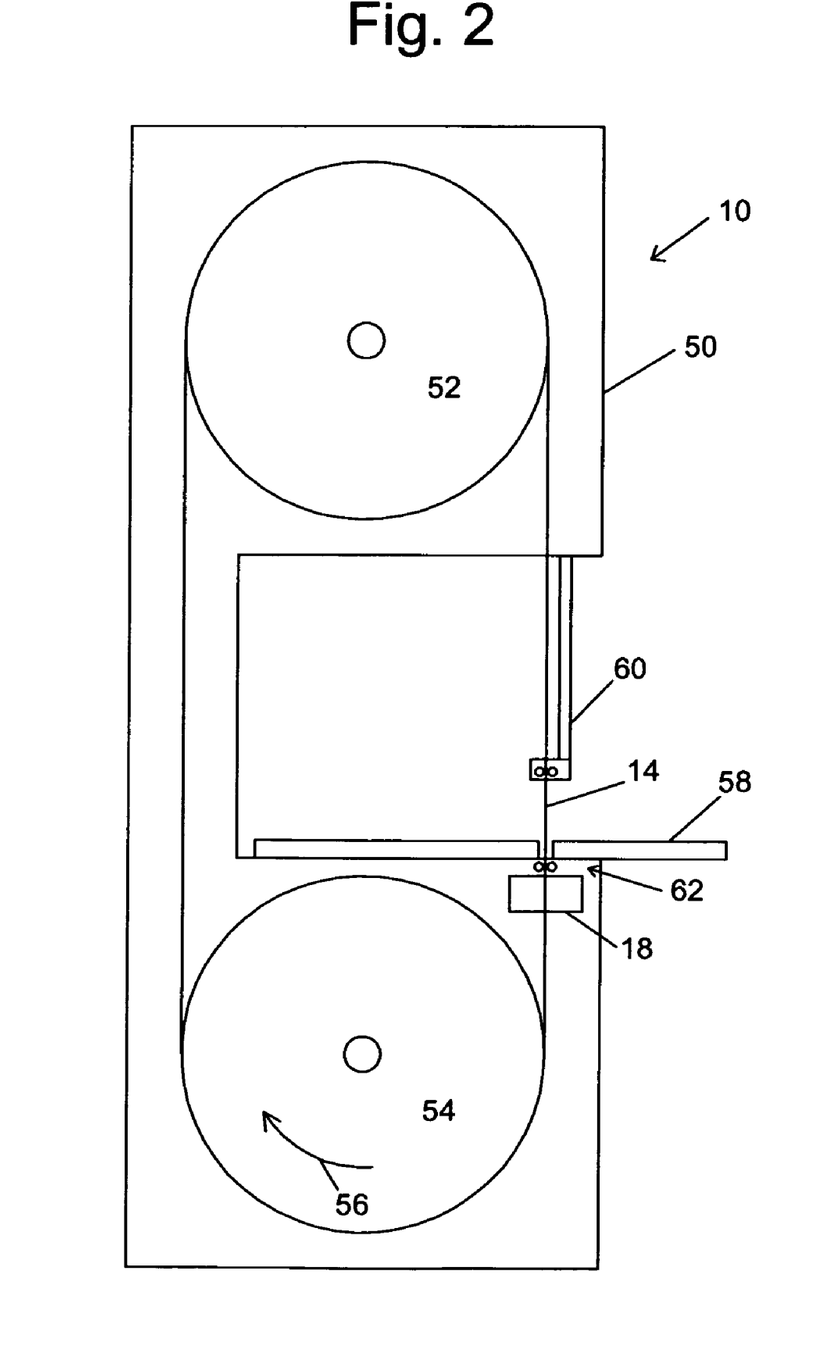
FIG. 2 is a schematic side elevation of an embodiment of a band saw with a fast-acting safety system.

One embodiment of band saw 10 is shown specifically in FIG. 2. It includes a main housing 50 enclosing a pair of spaced-apart wheels 52 and 54. Wheels 52 and 54 are supported for rotational movement by housing 50. Housing 50 typically encloses the wheels to prevent a user from touching them while they are spinning. The perimeter of each wheel may be coated or covered in a high-friction material such as rubber, etc. A relatively thin, continuous loop, tooth-edged blade 14 tightly encircles both wheels. Wheel 54 is driven by motor assembly 16 (not shown in FIG. 2) so that it rotates in the direction of arrow 56. Rotating wheel 54 causes blade 14 to move, which in turn, causes wheel 52 to rotate. Blade 14 moves adjacent table 58. A workpiece is cut by sliding the workpiece on table 58 into the teeth of moving blade 14 between wheels 52 and 54. An upper blade-guide assembly 60 and a lower blade-guide assembly 62 maintain the moving blade in a stable path.

Band saw 10 includes a detection subsystem 22 (shown in FIG. 1) to detect when a person's body comes into contact with blade 14. Detection subsystem 22 is based on the capacitance of a human body. It is believed that the capacitance of a user's body, as measured through dry contact with a portion of the user's body, is approximately 25–200 picofarads. That capacitance tends to increase with increasing body size and with increased coupling between the user's body and an electrical ground. As a result of the inherent capacitance of a user's body, when the user touches blade 14, the capacitance of the user's body is electrically coupled to the inherent capacitance of the blade, thereby creating an effective capacitance that is larger than the inherent capacitance of the blade alone. Detection subsystem 22 is configured to measure or monitor the capacitance of the blade, so that any substantial change in the measured capacitance would indicate contact between the user's body and the blade.

Figure 3:
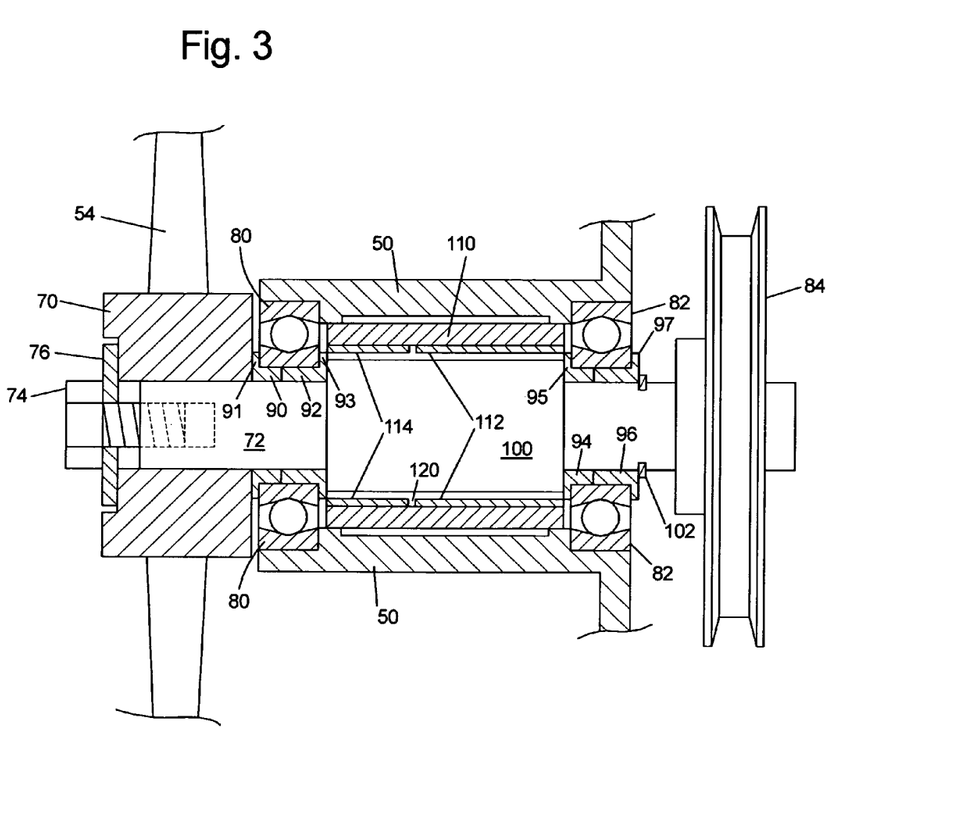
FIG. 3 shows a wheel mount with a capacitive coupling used in the band saw of FIG. 2.

FIG. 3 shows a capacitive coupling that may be used as part of the detection subsystem in measuring the capacitance of the blade to detect contact between the blade and a person. In FIG. 3, wheel 54 is shown mounted on an arbor or shaft 72 by a bolt 74 and washer 76. Arbor 72 extends through a hub 70 on the wheel, and bolt 74 is threaded into the arbor and presses against hub 70 to hold the wheel on the arbor.

Arbor 72 is supported for rotational movement by bearings 80 and 82, which are mounted in a portion of housing 50, and which are spaced along the length of the arbor. Bearings 80 and 82 do not directly contact arbor 72 or wheel 54. Rather, arbor 72 and wheel 54 are electrically isolated from bearings 80 and 82 by insulating bushings 90, 92, and 94, 96, respectively. Those bushings are configured to extend around the arbor, to receive the bearings, and to hold the arbor and wheel away from the bearings and housing so there is no metal-to-metal contact between the bearings/housing and the wheel/arbor. The bushings may be made from many different insulating materials, such as PET-P or some other hard plastic. Bushings 90 and 92 are held in place between wheel hub 70 and an enlarged portion 100 on the arbor that has a greater diameter than the rest of the arbor. Bushings 94 and 96, in turn, are positioned between enlarged portion 100 and a snap ring 102 on the arbor. In this manner, wheel 54 is supported by housing 50 for rotational movement, but is also electrically isolated from the housing. Bushing 90 includes a flange 91 sandwiched between hub 70 and bearing 80 to prevent the hub from touching the bearing. Similarly, bushing 92 includes a flange 93, and bushing 94 includes a flange 95, preventing enlarged portion 100 from touching either of bearings 80 or 82, and bushing 96 includes a flange 97 preventing snap ring 102 from touching bearing 82. A pulley 84 is mounted on the end of arbor 72 opposite wheel 54, and a belt (not shown) driven by motor assembly 16 may be used to drive pulley 84 and thereby spin arbor 72 and wheel 54 in bearings 80 and 82 to move blade 14. The belt is typically non-conducting and thus does not electrically couple the arbor to the housing.

A cylindrical, insulating sleeve 110 is positioned and securely held around enlarged portion 100 by housing 50. Sleeve 110 may be press-fit into an appropriate receptacle on the housing. Two electrically conductive plates or tubes 112 and 114, having an outer diameter that fits snugly within sleeve 110, are, in turn, press-fit into sleeve 110. Alternatively or additionally, plates 112 and 114 may be glued or otherwise mounted in sleeve 110. Sleeve 110 and plates 112 and 114 are coaxial and concentric to enlarged portion 100 of arbor 72. Plates 112 and 114 also have an inner diameter slightly larger than the diameter of enlarged portion 100 so that they do not contact any part of arbor 72. Plates 112 and 114 are spaced apart in sleeve 110 by a gap 120. Plates 112 and 114 may be made from any conductive material, such as brass tubing. Sleeve 110 protects plates 112 and 114 from damage and debris, and also electrically isolates the plates from housing 50.

Plates 112 and 114 may be thought of as contact detection plates that are used to create capacitive couplings with the arbor and blade. Detection subsystem 22 includes suitable electrical circuitry (e.g., such as described in U.S. Provisional Patent Application Ser. No. 60/225,200, entitled "Contact Detection System for Power Equipment," filed Aug. 14, 2000, by SD3, LLC, which is herein incorporated by reference) to transmit an input signal to plate 112, and to detect the input signal through plate 114 via wires (not shown) attached to the plates, which wires may extend from the plates through a hole or holes in sleeve 110 to detection subsystem 22. In other words, detection subsystem 22 imparts a signal on plate 112. That signal then drives a signal onto arbor 72 by virtue of the capacitive coupling between the plate and the arbor. The arbor is conductively coupled to wheel 54, so the signal induced on the arbor is also induced on the wheel. Blade 14 loops around a significant portion of the perimeter of wheel 54, so the signal on the wheel induces a signal on the blade. If wheel 54 includes a non-conductive, high-friction material such as rubber around its periphery to prevent the blade from slipping on the wheel when the wheel is rotated, then a signal is induced on the blade by a capacitive coupling between the blade and the wheel. If blade 14 directly contacts wheel 54, then the signal on the blade is the same as the signal on the wheel because of the conductive contact between the wheel and the blade. The signal on the arbor also induces a signal on plate 114 because of the proximity of the plate to the arbor. Thus, plate 114 monitors the signal on the blade/arbor. When a person touches the blade, the effective capacitance of the blade/arbor combination changes, causing the signal on plate 114 to change, thereby signaling contact between the blade and a person.

Plates 112 and 114 are mounted close to, but spaced-apart from, arbor 72. Those plates are capacitively coupled to the arbor by virtue of their size and placement parallel to and spaced-apart from the arbor. It is within the scope of the present invention that the number, size and placement of charge plates or tubes may vary.

The effect of this arrangement is to form two capacitors in series through the arbor, creating a capacitive shunt at the junction between the capacitors. Plates or tubes 112 and 114 function as charge plates of the capacitors. The input signal is capacitively coupled from plates 112 onto arbor 72, and then capacitively coupled from the arbor to plate 114. Any change in the capacitance of the blade/arbor changes the signal coupled to plate 114.

When a user touches blade 14, the capacitance of the user's body creates a capacitive load on the blade. As a result, the size of the capacitive shunt between plates 112 and 114 and the blade is increased, thereby reducing the charge that reaches plate 114. Thus, the magnitude of the input signal passed through the blade to plate 114 decreases when a user touches the blade. Detection subsystem 22 is configured to detect this change in the input signal and transmit a contact detection signal to control subsystem 26.

In some cases, there may be a significant amount of resistance at the contact point of the user's dry skin and the blade. This resistance may reduce the capacitive coupling of the user's body to the blade. However, when the teeth on the blade penetrate the outer layer of the user's skin, the moisture inherent in the internal tissue of skin will tend to decrease the resistance of the skin/blade contact, thereby establishing a solid electrical connection. The sensitivity of detection subsystem 22 can be adjusted as desired to recognize even slight changes in the input signal.

Generally speaking, the spacing of the charge plates or tubes from the arbor is not critical, and may vary depending on the charge plate area and the desired capacitive coupling.

Blade 14 must be electrically isolated from ground for the signal to be induced on the blade. Additionally, capacitive couplings between the blade and other parts of the saw must be minimized so that the relative increased capacitance caused from a person touching the blade is reliably measurable. In other words, if the blade is capacitively coupled to other items, such as to a blade guard or to the housing, then the increased capacitance from a person touching the blade will be insignificant compared to the combined capacitance of the blade and other items, meaning that the contact by the person will be harder to detect and the detection will be less reliable. Specifically, in a band saw, the blade will present a large surface area to wheel 52 and therefore will capacitively couple to that wheel.

Figure 4:
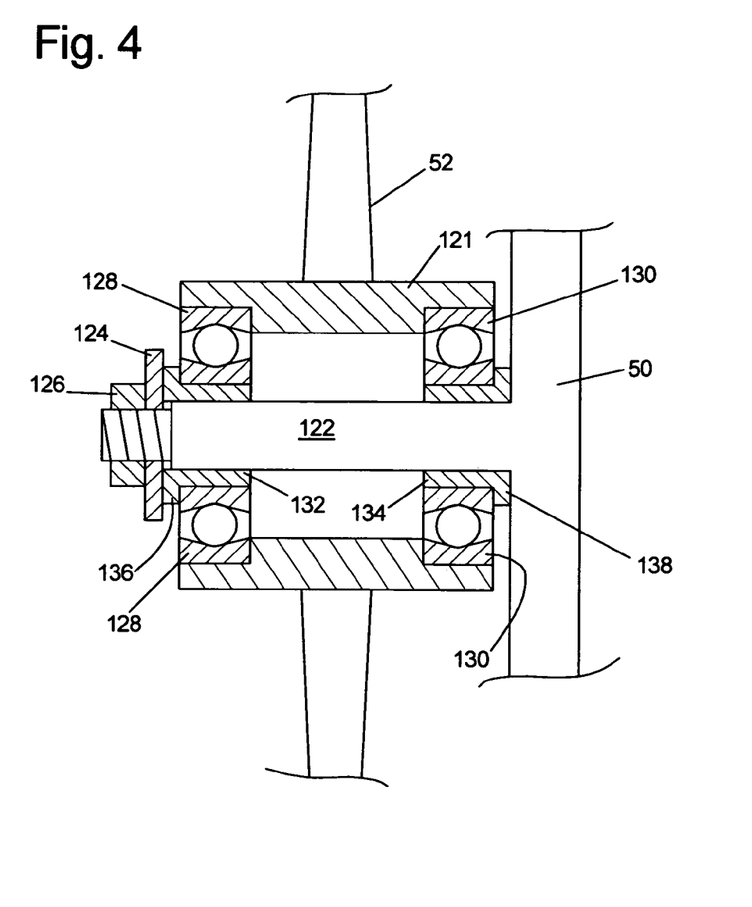
FIG. 4 shows a wheel mount used in the band saw of FIG. 2.

Band saw 10 addresses this issue by electrically isolating wheel 52 from housing 50, as shown in FIG. 4. Wheel 52 includes hub 121, and hub 121 is mounted on spindle 122 by washer 124 and nut 126 threaded onto the spindle. The spindle is mounted to, or is part of, housing 50, so the spindle and housing support the wheel. Bearings 128 and 130 are press fit into appropriate openings in the hub, and the bearings contact spindle 122 and support the hub and wheel on the spindle at spaced apart locations, as shown. The bearings support the wheel for rotational movement on the spindle. Two nonconductive bushings 132 and 134, made from PET-P, a hard plastic, or some other nonconductive material, are positioned between spindle 122 and bearings 128 and 130, respectively, to prevent the bearings from contacting the spindle. Bushing 132 includes a flange 136 sandwiched between bearing 128 and washer 124 to prevent any metal-to-metal contact between the bearing and the washer or spindle. Bushing 134 includes a similar flange 138 sandwiched between bearing 130 and housing 50 to prevent metal-to-metal contact between that bearing and the housing. With this construction, wheel 52 is electrically isolated from housing 50.

Thus, in band saw 10, a charge or signal on plate 112 induces a charge on arbor 72 and wheel 54, which in turn induces a charge on blade 14 and wheel 52. The charge on the arbor then induces a signal on plate 114, which is monitored by detection subsystem 22. When a person touches the blade, the effective capacitance of the blade/arbor/wheels combination changes so the charge on the arbor changes, and that change is immediately detected by the detection subsystem. No special or unique blade is required.

It will be appreciated that the size of charge plates 112 and 114 may be selected to provide a desired capacitance with the arbor. Indeed, the size of the charge tubes may be different to provide different capacitances. For example, in the embodiment depicted in FIG. 3, charge plate 112 is longer than charge plate 114, thereby providing a higher capacitance between charge plate 112 and the arbor, than between charge plate 114 and the arbor. Alternatively, or additionally, the inside diameters of the charge tubes may be different to provide different capacitances due to different arbor-to-charge plate spacings.

It will be appreciated that while the charge plates or tubes and insulating sleeve in the exemplary embodiment are cylindrical, other shapes may also be used. For example, insulating sleeve 110 may have a rectangular outer cross-section while maintaining its circular inner cross-section. Likewise, charge plates 112 and 114 may have any suitable outer cross-sectional shape to match the inner shape of the insulating tube.

Since charge plates 112 and 114 should not come into contact with each other, the fit between the charge plates and insulating sleeve 110 is typically tight enough to frictionally prevent movement of the charge plates along the axis of the insulating sleeve. Alternatively, a bump or ring may be formed or positioned on the inner diameter of the insulating sleeve between the charge plates to prevent the charge plates from coming into contact. As a further alternative, caulk, glue, epoxy, or similar material may be applied between the charge plates and insulating sleeve to prevent the charge plates from moving. As another alternative, one or more set-screws may be threaded through the insulating sleeve to bear against the charge tubes, making sure that the set screws do not contact the housing or some other metal that would ground the charge plates.

As explained above, blade 14 should be electrically isolated from housing 50, which is usually grounded. Thus, blade guide assemblies 60 and 62, which may include ball-bearing guides and/or friction pads, etc., are constructed to electrically insulate the blade from the main housing. Additionally, blade guards, parts of the housing, and other structure adjacent the blade may be made of non-conductive material to minimize any parasitic capacitance between the blade and other parts of the saw, as described above.

Insulating sleeve 110 may also be constructed to receive a Hall Effect or similar sensor to detect blade/arbor rotation, as described in more detail in U.S. Provisional Patent Application Ser. No. 60/225,094, entitled "Motion Detection System for Use in Safety System for Power Equipment," filed Aug. 14, 2000, by SD3, LLC, which is hereby incorporated by reference.

Electrically isolating the blade as described above has the advantage that the blade need not be capacitively isolated from wheels 52 and 54, which is difficult to do effectively. Nevertheless, and alternatively, capacitive couplings to the blade may be created in other ways, such as disclosed in U.S. Provisional Patent Application Ser. No. 60/225,211, entitled "Apparatus and Method for Detecting Dangerous Conditions in Power Equipment," filed Aug. 14, 2000, by SD3, LLC, and incorporated herein by reference.

Figure 5:
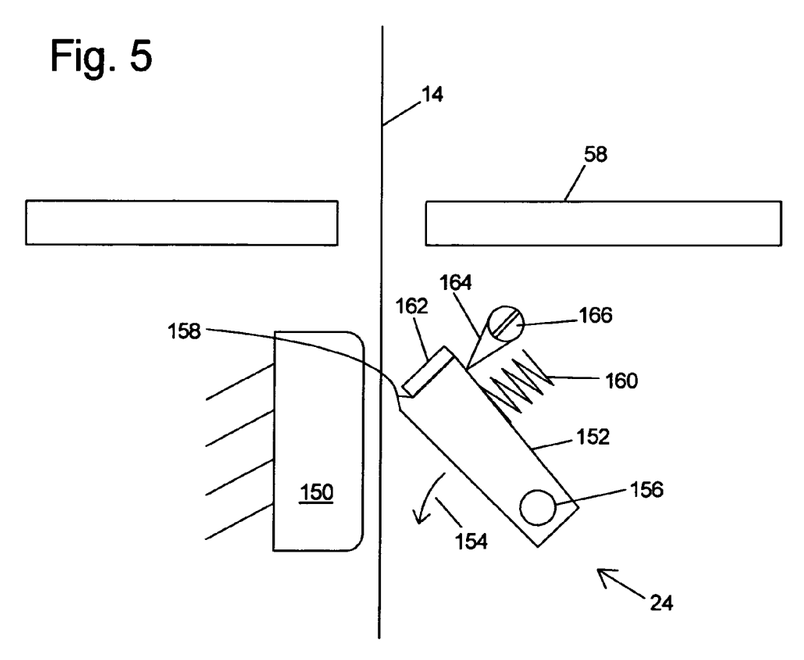
FIG. 5 shows schematically a reaction subsystem that stops a blade by cutting and gripping the blade.

As explained above, when detection subsystem 22 detects contact between the blade and a person, reaction subsystem 24 reacts to prevent or limit injury to the person. FIG. 5 shows schematically one embodiment of a reaction system that stops the blade by cutting and gripping the blade. In the illustrated embodiment, reaction subsystem 24 is shown adjacent blade 14 and under table 58. Reaction subsystem 24 includes a backing plate 150 supported by the housing and positioned near one side of blade 14. Backing plate 150 is made of either hardened or non-hardened metal.

A cutting pawl 152 is mounted adjacent backing plate 150 on the opposite side of blade 14. Cutting pawl 152 is made from hardened steel. Cutting pawl 152 is mounted to pivot in the direction of arrow 154 around pivot pin 156 mounted to the housing of the saw. Cutting pawl 152 includes a cutting edge 158 on the end of the pawl opposite pivot pin 156. Pawl 152 is configured to pivot down so that cutting edge 158 contacts blade 14 and cuts the blade against backing plate 150. Cutting pawl 152 and backing plate 150 may be thought of as brake mechanism 28 shown in FIG. 1.

The force to pivot pawl 152 into the blade to cut the blade is, in part, provided by spring 160, which typically is a spring providing approximately 10 to 500 pounds of force. The spring is configured to force pawl 152 in the direction of arrow 154. When spring 160 pushes cutting edge 158 into blade 14, the downward motion of the blade also pushes pawl 152 downward, so that pawl 152 effectively locks on the blade and uses the motion of the blade to help cut the blade. Spring 160 may be thought of as biasing mechanism 30 discussed above.

Cutting pawl 152 also includes a gripping surface 162 to grip the blade and hold it against backing plate 150 both while the blade is cut and thereafter until the pawl is moved back away from the blade. Gripping surface 162 may be simply a surface on the pawl, or it may be a layer of high-friction material such as rubber or plastic, as shown in FIG. 5. Gripping surface 162 also may be thought of as part of brake mechanism 28 discussed above. Gripping surface 162 is optional, and cutting pawl 152 may be made without a gripping surface. In that case, reaction subsystem 24 simply stops the blade by cutting it, without simultaneously gripping the blade.

A fuse wire 164 is used to hold cutting pawl 152 away from blade 14 until the detection subsystem detects that a person has contacted the blade. The fuse wire is mounted around a contact 166 that is part of a firing subsystem. When the detection subsystem detects that a person has contacted the blade, the firing subsystem sends a surge of electrical current through fuse wire 164, burning the wire and releasing the cutting pawl. Possible fuse wires and firing subsystems are disclosed in more detail in U.S. Provisional Patent Application Ser. No. 60/225,056, entitled "Firing Subsystem for Use in a Fast-Acting Safety System," filed Aug. 14, 2000, by SD3, LLC, and incorporated herein by reference. A mechanism providing mechanical advantage to hold the cutting pawl away from the blade may be used, as described in U.S. Provisional Patent Application Ser. No. 60/225,170, entitled "Spring-Biased Brake Mechanism for Power Equipment," filed Aug. 14, 2000, by SD3, LLC, and incorporated herein by reference. Fuse wire 164 may be thought of as restraining mechanism 32, and the firing subsystem may be thought of as release mechanism 34.

When cutting pawl 152 cuts blade 14, the tension of the blade around wheels 52 and 54 is released and the blade stops immediately. The blade has relatively little mass, and therefore little momentum, so the blade stops without incident. Additionally, the majority of blade 14 is typically within housing 50 so that the housing would contain the blade even if the blade tended to lash out when cut.

Figure 6:
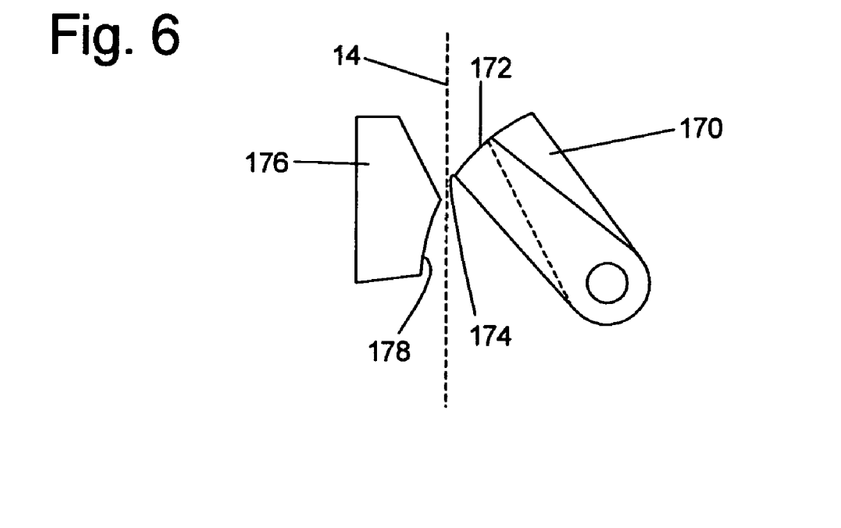
FIG. 6 is a schematic representation of one embodiment of a cutting pawl and backing plate used in a reaction system that stops a blade by cutting the blade.

FIG. 6 shows another type of cutting pawl at 170. Cutting pawl 170 is pivotally mounted to cut blade 14, as described above. Cutting pawl 170 includes a cutting edge 172 that extends helically away from the blade relative to the blade so that the cutting edge first contacts the blade at a point designated at 174, and then progressively moves into and across the blade. The cutting edge may extend helically away from blade 14, as if the pawl had been twisted around an axis perpendicular to the pivot axis of the pawl. Additionally, the pivot point of pawl 170 may be mounted to the housing of the saw so that the pawl pushes blade 14 back, away from where the blade would normally cut, thereby retracting or pushing the blade away from the point where a person most likely would accidentally contact the blade. For example, the pivot may be non-parallel to the table so that the pawl pushes the blade down and back. FIG. 6 also shows a backing plate 176 against which cutting pawl 170 cuts blade 14. Backing plate 176 includes a curved surface 178 that follows the radius of cutting pawl 170 as it pivots. Cutting pawl 170, shown in FIG. 6, may be released to cut blade 14 as described above in connection with the embodiment shown in FIG. 5.

Figure 7:
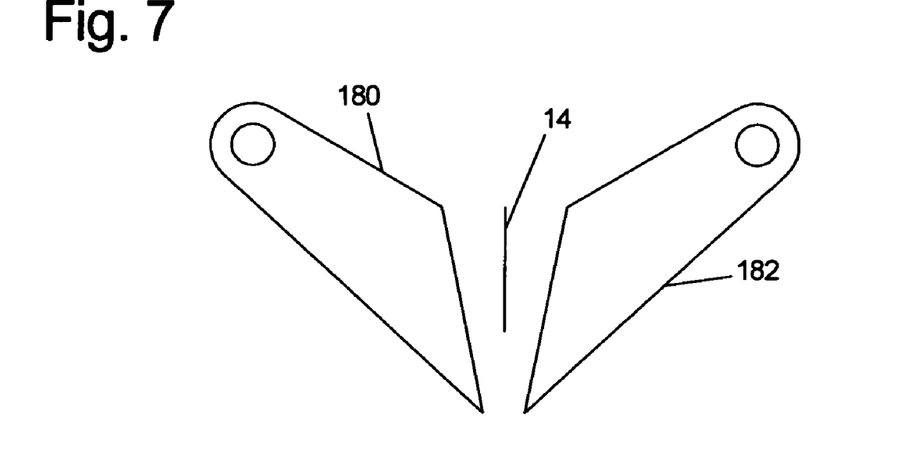
FIG. 7 is a schematic top view of another embodiment of cutting pawls used in a reaction system to stop a blade by cutting the blade.
Figure 8:
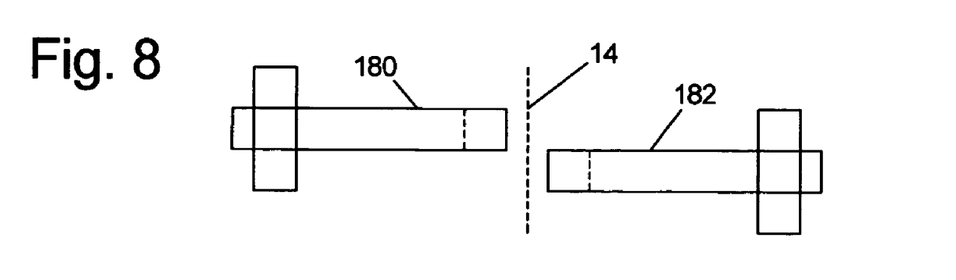
FIG. 8 is a schematic front view of the cutting pawls shown in FIG. 7.

FIG. 7 shows a top view, and FIG. 8 shows a front view, of another way of cutting blade 14 upon the detection of contact between a person and the blade. The embodiment shown in FIGS. 7 and 8 includes two cutting pawls, 180 and 182, each positioned on one side of blade 14, to act like scissors to cut the blade. FIG. 8 shows how the pawls are positioned vertically relative to each other to act like scissors. The pawls would be released by a fuse wire and firing system, and pushed into the blade by springs, as described above. The pawls may be configured to strike the front of blade 14 first so that the pawls retract or push the blade back and away from a user of the saw. Pawls 180 and 182 also could be configured and mounted to the housing to strike blade 14 at an angle so that they lock onto the blade and so that they are self-feeding due to the motion of the blade. Pawls 180 and 182 also could be mounted so that they move down with blade 14 as they cut the blade.

Additionally, any of the cutting pawls described above may have a cutting edge made of carbide or hardened steel. Carbide or hardened steel would likely be harder than the blade, and therefore, would more easily gouge into, cut and grip the blade.

Figure 9:
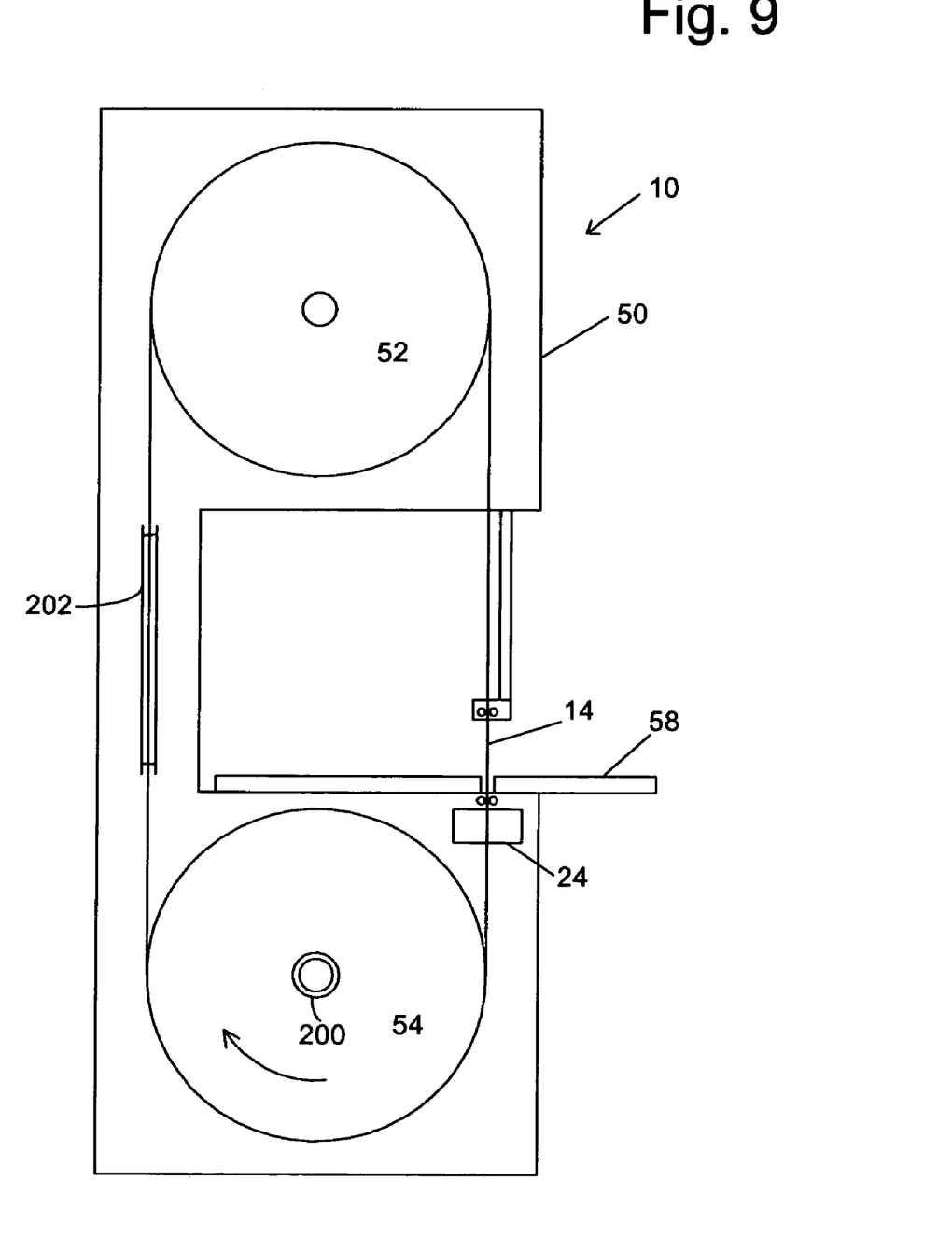
FIG. 9 shows another embodiment of a band saw with a fast-acting safety system.

Another embodiment of a band saw with a detection and reaction system is shown in FIG. 9. The band saw is shown at 10, and it is constructed substantially like the band saw discussed above in connection with FIG. 2, including a frame/housing 50, wheels 52 and 54, a blade 14 positioned around the wheels, and a table 58. Wheels 52 and 54 are electrically isolated from the rest of the saw in the same manner as shown in FIGS. 3 and 4. Wheel 54 is also mounted in the saw with an electrically conductive plate or tube 200 surrounding the arbor of the wheel, similar to plate 112 discussed above and shown in FIG. 3. Plate 200 is configured like plate 112 to create a capacitive coupling to wheel 54 and blade 14, as discussed above. Detection system 22 is connected to plate 200, and the detection system imparts the electrical signal to the plate to create the capacitive coupling.

One way the band saw shown in FIG. 9 differs from the band saw shown in FIGS. 2–4 is that the band saw shown in FIG. 9 includes an electrically conductive plate 202 positioned adjacent blade 14 and extending along the blade between wheels 52 and 54, as shown. Plate 202 may take many forms. It is shown as two sub-plates, one on each side of blade 14, conductively coupled together by conductive bridges that connect the two sub-plates behind the blade (i.e., adjacent the non-tooth edge of the blade). Thus, plate 202 may be thought of as having a substantially C-shaped cross-section sized to fit around the sides and back edge of the blade. Plate 202 is made from a thin copper plate laminated to a thin plastic or fiberglass backing sheet so that at least one side of the plate is non-conductive. The plate is positioned so that the non-conductive side is adjacent the blade. In this manner, if the blade deflects or moves to one side and contacts the plate, the blade contacts the non-conductive side rather than the conductive side. If the blade contacted the conductive side, then the detection system may interpret that as a contact with a person and trigger the reaction system. Although the plate 202 is illustrated as being disposed on both sides of blade 40, the plate alternatively may be disposed on only one side. Of course, plate 202 may take many different forms and sizes.

The band saw shown in FIG. 9 also includes a reaction subsystem 24 positioned under table 58 adjacent the blade. The reaction subsystem, shown in detail in FIG. 10, includes a brake mechanism 204 designed to sever and hold the blade upon receipt of a contact detection signal. By severing the blade, the tension fit of the blade around the wheels is released, allowing the blade to be stopped without stopping the wheels.

Figure 10:
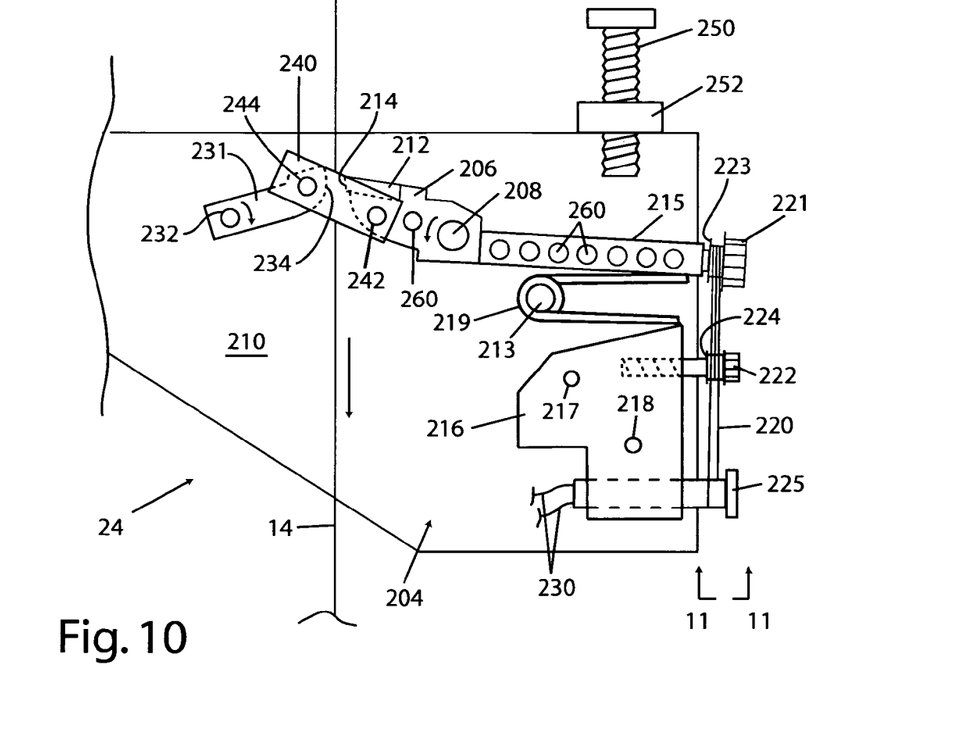
FIG. 10 shows a brake mechanism used in the band saw of FIG. 9.

Brake mechanism 204 includes a first cutting pawl 206 mounted by a shoulder bolt 208 to a support plate 210 which, in turn, is attached to or is part of the frame or housing 50 of the saw. First cutting pawl 206 is mounted to pivot around bolt 208, and is positioned close to blade 14 so that when the cutting pawl pivots counterclockwise around the bolt, the pawl contacts the blade. First cutting pawl 206 includes a carbide tip 212 that has a cutting edge 214 used to cut the blade, as explained in more detail below.

The first cutting pawl also includes an arm 215 extending outwardly from bolt 208 away from cutting edge 214. A block 216 is mounted to support plate 210 by bolts 217 and 218, and a torsion spring 219 is positioned and compressed between arm 215 and block 217. Spring 219 applies a force against arm 215 to pivot the first cutting pawl into the blade. The torsion spring may apply a force of 25 to 100 pounds or more. The spring is held in place by a bolt 213 that threads into a hole in support plate 210.

First cutting pawl 206, however, is restrained from movement by a fusible wire 220 that wraps around a bolt 221 screwed into the end of arm 215, and around a bolt 222 and an electrode 225 on block 216. Wire 220 may be, for example, a stainless steel wire with a diameter of 0.010-inches. The wire may be wrapped a plurality of times around bolts 221 and 222 in order to hold spring 219. For example, wire 220 may have a breaking tensile strength of around 20 pounds, so wrapping the wire around bolts 221 and 222 twice would provide four strands of wire, which together has enough tensile strength to hold a 40 pound spring. The wire is also looped once around electrode 225 so that the electrode can fuse the wire to release the spring, as described below. In FIG. 10, wire 220 is looped twice around bolts 222 ad 224, and once around electrode 225. Bolts 221 and 222 also include insulating sleeves or bushings 223 and 224, respectively, that prevent wire 220 from contacting the bolts. The sleeves are shaped like bobbins and they fit around the bolts. They provide the insulation necessary to prevent wire 220 from making a conductive path to the bolts, which could affect the functioning of the system depending on how the system is arranged. Non-conductive washers may be placed on bolts 221 and 222 between the sleeves and arm 215 or block 216. Additionally, block 216 is made from a non-conductive material, such as polycarbonate, to insulate wire 220 and electrode 225 from the rest of the saw.

Figure 11:
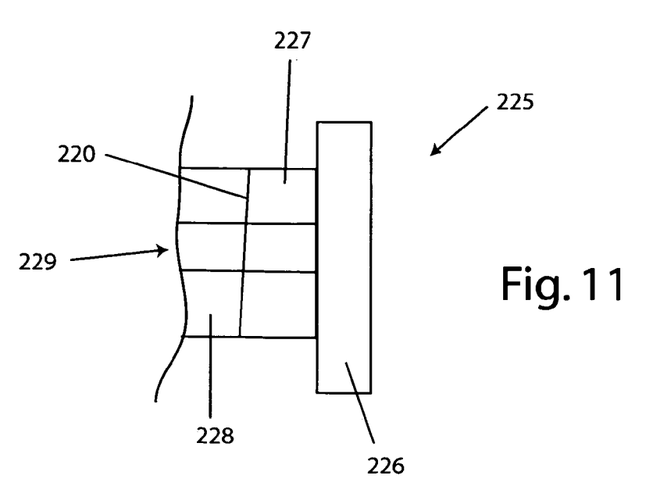
FIG. 11 shows an electrode used in the brake mechanism of FIG. 10.

Electrode 225 includes a non-conductive core 226, and two conductive plates 227 and 228 positioned around the core, as shown in FIG. 11. (FIG. 11 is a simplified view of electrode 225 taken along the line 11—11 shown in FIG. 10.) The two plates are separated by a gap 229 so that the two plates do not touch. Wire 220 is wrapped around the electrode so that the wire spans the gap between the two plates. Plate 227 and plate 228 are each connected by wires 230 to a firing subsystem that supplies a surge of electric current when the detection subsystem detects contact between a person and the blade of the saw. The current passes from one plate to the other through the wire, and melts or breaks the wire, like a fuse. When the wire is broken, first cutting pawl 206 is free to pivot, so spring 219 pushes the pawl into the blade. Applicable fuse wires and firing subsystems are described in more detail in U.S. Provisional Patent Application Ser. No. 60/225,056, titled "Firing Subsystem for Use in a Fast-Acting Safety System," filed Aug. 14, 2000, which is incorporated by reference.

Brake mechanism 204 also includes a second pawl 231 mounted by shoulder bolt 232 to support plate 210. The second pawl pivots around bolt 232, and is positioned close to blade 14, but on the side of the blade opposite the first cutting pawl. The second pawl includes a surface 224 against which the cutting edge of the first cutting pawl presses to cut the blade.

The two pawls are connected by a link 240. Shoulder bolt 242 connects one end of the link to first cutting pawl 206, and shoulder bolt 244 connects the other end of the link to second pawl 230. The link is free to pivot around the shoulder bolts.

When electrode 225 burns wire 220 and releases the first cutting pawl, spring 219 pushes that pawl toward the blade. The first cutting pawl then pulls on link 240, which in turn, pulls second pawl 231 toward the blade so that the blade is sandwiched between the two pawls. Cutting edge 214 cuts into the blade and pushes it against surface 234 on the second pawl. Cutting edge 214 preferably (but not necessarily) is carbide, as stated, which is harder than the typical blade, so the cutting edge gouges into and cuts the blade more easily and quickly than it otherwise would. The two pawls are configured so that when they contact the blade, the downward motion of the blade itself pulls the pawls together. In that manner, the movement of the blade is used to sever the blade. As soon as the blade is cut, the tension in the blade is released and the blade stops moving, even though the wheels driving the blade continue to turn, and the blade is held in place between the two pawls.

Brake mechanism 204 also includes a bolt 250 threaded into a flange 252 on support 210. Bolt 250 is used to push the first cutting pawl against spring 219 to compress the spring while a new fuse wire is installed. In that manner, bolt 250 is used to re-cock the brake mechanism. After a new fuse wire is installed, bolt 250 is backed off to allow the first cutting pawl to pivot when the new fuse wire is melted. Bolt 250 may also act as a stop to limit the pivoting of first cutting pawl 206. The brake mechanism, or part of the mechanism, also may be enclosed in a case or housing. For example, a case may be fitted over the fuse wire and electrode to protect the wire.

Figure 12:
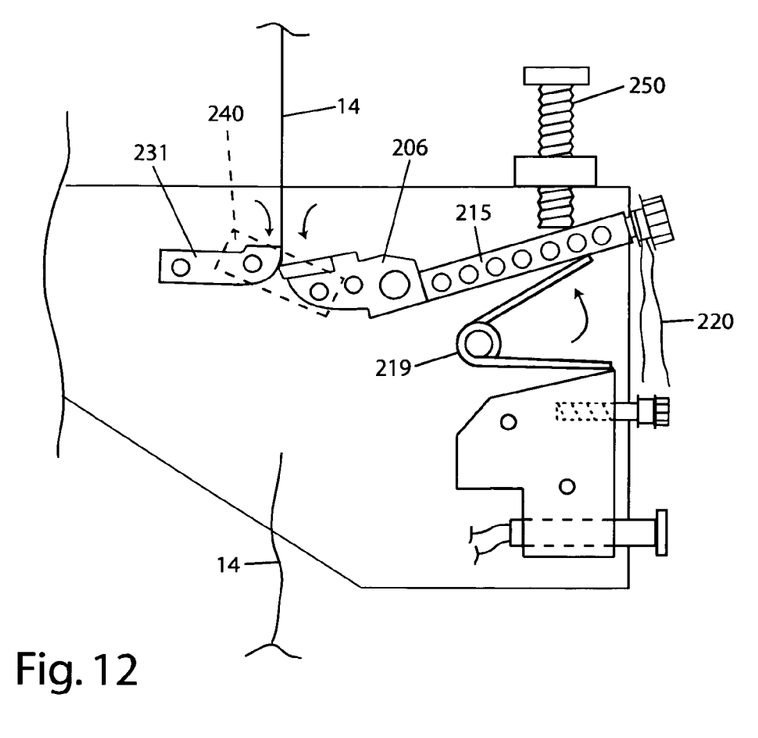
FIG. 12 shows the brake mechanism of FIG. 10 in a fired or triggered state.

FIG. 12 shows brake mechanism 204 after wire 220 has been broken and spring 219 has expanded and moved pawl 206 and 231 together to sever blade 14. Bolt 250 has contacted arm 215 to stop the pivoting of pawl 206 so that the pawl does not pivot past surface 234 on pawl 231. One end of severed blade 14 is held by the pawls, and the other end of the severed blade is loose. In FIG. 12, link 240 is shown in dashed lines.

Much of the time required for brake mechanism 204 to stop the blade is spent moving the pawls from their initial position into the blade. The force required to accelerate the pawls so that they contact the blade as quickly as possible depends on the mass of the pawls. Accordingly, it is desirable to minimize the mass of the pawls so that a given force will accelerate the pawls as much as possible. In the mechanism shown in FIG. 10, first cutting pawl 206 has holes cut into the pawl to minimize its mass, and several of those holes are identified at 260. Additionally, the pawls 206 and 231 can be shaped to minimize mass, such as by relieving certain areas of the pawls, etc. Washers also may be placed between the pawls and support plate 210 on the bolts holding the pawls to the support plate, as well as at other contact locations, to minimize friction which slows down the speed at which the pawls rotate. Of course, the size and configuration of brake mechanism 204 may vary depending on such factors as the size and width of blade 14, the blade material, blade speed, etc.

A physical embodiment of brake mechanism 204 using a 40-pound spring and a fuse wire as described above has been measured to stop a ½-inch wide blade in approximately 3-milliseconds after contact with the blade by a hot dog used to represent a finger. To minimize or prevent substantial injuries, brake mechanisms should be constructed to stop the blade in up to approximately 10-milliseconds, and preferably within 2- to 5-milliseconds.

The safety systems discussed above may optionally be configured to shut off the motor to the band saw as well as to sever the blade.

The band saws described above are substantially safer than existing band saws because they include a safety system adapted to detect the occurrence of a dangerous condition, such as a person accidentally touching the moving blade, and to stop movement of the blade to prevent or minimize serious injury to a user.

Some band saws include separate housings for each of the top and bottom wheels, with a cast iron frame supporting the wheels and housings, and with the blade extending between the wheels. For those saws, the part of the blade extending between the wheels on the side opposite the table or cutting zone may be covered by a protective sheath, and plate 202 shown in FIG. 9 may be included as part of that sheath.

The band saws also may be modified for use in the meat cutting industry. In that case, the detection system would be modified so that a user of the band saw would wear a glove with one or more interior wires on which an electrical signal is induced. When the blade cuts into the glove and contacts the interior wires, the blade would ground the wires and the detection subsystem would detect that the signal on the wires had changed. The reaction system would then trigger as described above.

While several particular exemplary embodiments have been described and illustrated, it will be appreciated that many different modifications and alterations may be made within the scope of the invention.

The safety systems and band saws described herein are applicable to band saws, as well as to other woodworking equipment such as table saws, miter saws, circular saws, jointers, etc. The safety systems described herein may be adapted or modified in many ways, and further embodiments and descriptions of detection systems, reaction systems, brakes, actuators, firing systems, release mechanisms, control systems, self-test systems, specific implementations, features, etc., applicable to band saws and to the safety systems described herein may be found in the following references, the disclosures of which are incorporated by reference: PCT Patent Application Ser. No. PCT/US00/26812, filed Sep. 29, 2000; U.S. patent application Ser. No. 09/676,190, filed Sep. 29, 2000; U.S. Provisional Patent Application Ser. No. 60/307,756, filed Jul. 25, 2001; U.S. Provisional Patent Application Ser. No. 60/306,202, filed Jul. 18, 2001; U.S. Provisional Patent Application Ser. No. 60/302,916, filed Jul. 3, 2001; U.S. Provisional Patent Application Ser. No. 60/302,937, filed Jul. 2, 2001; U.S. Provisional Patent Application Ser. No. 60/298,207, filed Jun. 13, 2001; U.S. Provisional Patent Application Ser. No. 60/292,100, filed May 17, 2001; U.S. Provisional Patent Application Ser. No. 60/292,081, filed May 17, 2001; U.S. Provisional Patent Application Ser. No. 60/279,313, filed Mar. 27, 2001; U.S. Provisional Patent Application Ser. No. 60/275,595, filed Mar. 13, 2001; U.S. Provisional Patent Application Ser. No. 60/275,594, filed Mar. 13, 2001; U.S. Provisional Patent Application Ser. No. 60/275,583, filed Mar. 13, 2001; U.S. Provisional Patent Application Ser. No. 60/273,902, filed Mar. 6, 2001; U.S. Provisional Patent Application Ser. No. 60/273,178, filed Mar. 2, 2001; U.S. Provisional Patent Application Ser. No. 60/273,177, filed Mar. 2, 2001; U.S. Provisional Patent Application Ser. No. 60/270,942, filed Feb. 22, 2001; U.S. Provisional Patent Application Ser. No. 60/270,941, filed Feb. 22, 2001; U.S. Provisional Patent Application Ser. No. 60/270,011, filed Feb. 20, 2001; U.S. Provisional Patent Application Ser. No. 60/233,459, filed Sep. 18, 2000; U.S. Provisional Patent Application Ser. No. 60/225,212, filed Aug. 14, 2000; U.S. Provisional Patent Application Ser. No. 60/225,210, filed Aug. 14, 2000; U.S. Provisional Patent Application Ser. No. 60/225,201, filed Aug. 14, 2000; U.S. Provisional Patent Application Ser. No. 60/225,170, filed Aug. 14, 2000; U.S. Provisional Patent Application Ser. No. 60/225,169, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; U.S. Provisional Patent Application Ser. No. 60/182,866, filed Feb. 16, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

We claim:

1. A band saw comprising:
    a frame;
    at least two, spaced apart, rotatable wheels supported by the frame;
    a blade looped around the wheels, where rotation of at least one wheel causes the blade to move around the wheels;
    a detection system adapted to detect a dangerous condition between a person and the blade; and
    a reaction system configured to sever the blade upon detection of the dangerous condition; where the reaction system includes a first pawl adapted to pivot into contact with the blade, a cutting edge on the first pawl, and a second pawl against which the cutting edge presses to sever the blade.

2. The band saw of claim 1, where the cutting edge on the first pawl is carbide.

3. The band saw of claim 1, where the first pawl includes an arm, where the reaction system further includes a spring, and where the spring is adapted to push against the arm to bias the first pawl to pivot toward the blade.

4. The band saw of claim 3, where the reaction system further includes a restraint adapted to prevent the first pawl from pivoting into contact with the blade.

5. The band saw of claim 3, where the spring is a torsion spring.

6. The band saw of claim 5, where the reaction system further includes a spring contact surface, and where the torsion spring is positioned between the arm of the first pawl and the spring contact surface.

7. The band saw of claim 1, where the first pawl is positioned on one side of the blade, and the second pawl is positioned on the opposite side of the blade.

8. The band saw of claim 7, where the first and second pawls are pivotally mounted on a support plate.

9. The band saw of claim 7, further comprising a link having two ends, where one end of the link is pivotally connected to the first pawl and the other end of the link is pivotally connected to the second pawl.

10. The band saw of claim 9, where the link causes the second pawl to pivot toward the blade when the first pawl pivots toward the blade.

11. The band saw of claim 10, where the first and second pawls are configured so that when they contact the blade, the motion of the blade pulls the pawls together.

12. The band saw of claim 1, where the first pawl includes recesses to minimize the mass of the pawl.

13. The band saw of claim 1, where the reaction system includes a spring biasing the first pawl toward the blade, a restraint adapted to prevent the first pawl from pivoting into contact with the blade until the detection system detects a dangerous condition, and a cocking mechanism adapted to facilitate the installation of the restraint.

14. The band saw of claim 13, where the cocking mechanism comprises a bolt adapted to compress the spring while the restraint is installed.

15. The band saw of claim 14, where the bolt is further adapted to limit the pivoting of the first pawl.

* * * * *